United States Patent [19]

McCausland et al.

[11] Patent Number: 5,243,331
[45] Date of Patent: Sep. 7, 1993

[54] KEYPAD FOR COMPUTER SYSTEM

[75] Inventors: Robert G. McCausland, Mendham; Richard F. Kearns, Huntington, both of N.J.

[73] Assignee: Automated Market Systems, L.P., Hartford, Conn.

[21] Appl. No.: 993,904

[22] Filed: Dec. 18, 1992

Related U.S. Application Data

[63] Continuation of Ser. No. 643,602, Jan. 18, 1991, abandoned.

[51] Int. Cl.⁵ .............................................. G09G 3/02
[52] U.S. Cl. ................................. 345/172; 340/825.26
[58] Field of Search .................... 341/22; 340/825.26, 340/825.27, 711

[56] References Cited

U.S. PATENT DOCUMENTS

| | | | |
|---|---|---|---|
| 3,675,208 | 7/1972 | Bard | 340/711 X |
| 3,792,462 | 2/1974 | Casey et al. | 340/825.26 X |
| 4,725,830 | 2/1988 | Kawai et al. | 340/709 |
| 4,812,832 | 3/1989 | Oishi et al. | 340/711 X |
| 4,937,778 | 6/1990 | Wolf et al. | 340/711 X |

*Primary Examiner*—Ulysses Weldon
*Attorney, Agent, or Firm*—Mason, Fenwick & Lawrence

[57] ABSTRACT

A keypad for interacting with a computer system having a display screen. The keypad includes a substantially planar base surface. A numeric/control key cluster is positioned on a first half of said planar base surface. The numeric/control key cluster incudes a 10-digit numeric key set, a plurality of cursor movement keys, and a plurality of control keys. A screen select key cluster is positioned on a second half of said planar base surface. The screen select key cluster includes a plurality of control keys for controlling display of information on the display screen.

18 Claims, 9 Drawing Sheets

| ‖‖ PERSONAL PAGE ‖‖ | STATU-OPEN | 03-09-1990 | 12:30:04 | PAGE 1 of 1 |
|---|---|---|---|---|
| # ISSUE | BID | OFFER | LAST | BID-CURRENT ORD.OFR |
| 1 09/14/90 WI 1 YR | 25 7.67 | 663 105 | h 7.76 15 | 7.663 5 |
| 2 | | | | |
| 3 | | | | |
| ... | | | | |
| 19 | | | | |
| ACTION: | | | | |

FIG. 7

| ‖‖ THE BILLS PAGE ‖‖ | STATUS: OPEN | 03-09-1990 | 12:30:04 | PAGE 1 of 1 |
|---|---|---|---|---|
| ISSUE | BID | OFFER | ISSUE | BID | OFFER |
| 12/14/89 3 | 25 7.81 | .81 50 | 12/21/89 WI | 100 7.81+ | .80+ 25 |

FIG. 8

| | | 906 | | | |
|---|---|---|---|---|---|
| OFF THE RUN GOV MKT | | STATUS-OPEN | 03-09-1990 | 12:3004 | PAGE 2 of 2 |
| LN | ISSUE | BID | OFFER | YIELD | LAST |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| ACTION: | | | | | |

*FIG. 9A*

| | 916 | | | |
|---|---|---|---|---|
| OFF THE RUN COUPON INDEX | STATUS: OPEN | 03-09-1990 | 123004 | PAGE 1 of 2 |
| | COLUMN 1 | COLUMN 2 | COLUMN 3 | COLUMN 4 |
| 1 | 8 1/2 09-89 | 8 3/8 12-89 | 6 1/2 02-90 | 10 1/2 04-90 |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | 918 | | | |
| 20 | 1230 ACK BACKLOGGED TRANSACTION CHECK COMPLETED | | | |

*FIG. 9B*

```
|||BULLETIN BOARD|||        STATUS: OPEN    03-09-1990  12:3004   PAGE 1 of 2
TIME TRN DESCRIPTION                                COMMENT         ORDER ID
16:58 BKL BID  CHECK ON BACKLOGGED TRANSACTIONS  ORDER IN BOOK   1735-4Y17
 1102     1106      1108                             1110         1112
      1104
```

FIG. 9C

KEYPAD FOR COMPUTER SYSTEM

This application is a continuation of U.S. Pat. application Ser. No. 07/643,602, filed Jan. 18, 1991, now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but the copyright owner reserves all other copyright rights whatsoever. [1077 o.G. 22, 2 Apr. 87]. The disclosure of FIGS. 3, 5A and 5B are subject to copyright protection.

RELATED APPLICATION

The present application relates to copending U.S. Pat. Application Ser. No. 07/643,231, filed on Jan. 18, 1991, entitled COMPUTER AUTOMATED SECURITIES TRADING SYSTEM, invented by Lawrence J. Gomes, Robert G. McCausland, Richard F. Kearns, Alex P. Lee, Michael L. Pires, and Robert J. Gomes, and incorporated by reference herein.

BACKGROUND OF THE INVENTION

1. Field Of The Invention

The present invention generally relates to a keypad for human interaction with a computer system for automated real-time trading of securities such as stocks, bonds, commodities and Government securities.

2. Prior Art

Every day, a modern securities exchange or trading market provides a forum for completing transactions worth millions of dollars, constituting hundreds of millions of shares, all executed at a frenetic pace. As computerized electronic communications systems have increased the speed b which information is transferred, stock and securities trading transactions have likewise accelerated. Consequently, investors now desire instant response to a rising or falling market.

A variety of market trading methods have been used in the prior art. For an informative discussion of these methods see U.S. Pat. No. 4,412,287 (Braddock, III).

In the market for trading United States Government-issued securities, including Treasury bills, Treasury Notes, Agency Bonds, Municipal Bonds, Currencies, and other securities (each designated an "issue"), market operations heretofore have been completed manually. Government securities are classified in three basic groups: Treasury (such as Treasury bills), agency (mostly Government-sponsored enterprises such as the Student Loan Marketing Association), and mortgage-backed. About 40 primary dealers, mostly securities firms and large banks, buy securities directly from the Federal Reserve Bank of New York. These dealers are required to be credit-worthy and to help keep the market liquid by buying and selling in volume. Seven "screen brokers" operate the computer systems that allow primary dealers to trade securities with each other anonymously. The term "screen broker" comes from the CRT display screens upon which these brokers show the bid and offer prices for securities.

The primary dealers sell to a "secondary market" comprised of large institutional investors and more than 1000 secondary dealers who do much of the reselling of securities to smaller investors. Trading in the secondary market occurs worldwide, 24 hours a day, in which deals are made on the telephone. Customers include financial institutions, state and local governments, and individuals.

In a typical transaction, an investor telephones his or her broker, who is a secondary dealer, to make an offer for purchase or bid for sale of a particular issue. The secondary dealer/broker then telephones one of the primary dealers to enter the offer or bid. If the primary dealer cannot satisfy the bid or offer from inventory, then the dealer telephones one of the screen brokers to enter the offer or bid. The screen broker then reviews previously received offers and bids from other primary dealers, and attempts to match a previous offer with the newly-received bid or a previous bid with a newly-received offer. When a match is made, the screen broker contacts the transacting primary dealers to consummate the transaction. The primary dealer contacts the secondary dealer who, in turn, contacts the investor.

Unfortunately, this transaction system is limited by human capacity for telephone communication. Presently, traders may commonly have 60 or more telephones at their workstations connected to brokers, dealers and investors, and up to 12 video display terminals each connected to one of the numerous screen brokers. Simultaneously the trader must communicate with such multiple parties, monitor orders, and communicate, with the markets to complete transactions. During active market operations, a trader's capacity to continuously process new transactions becomes severely strained.

The known prior art trading systems do not provide substantial local processing of data, so that a trader must view only information transmitted by the mainframe computer system. The prior art systems are not designed for easy interaction between the trader and the system.

SUMMARY OF THE INVENTION

The present invention relates to an improved computer system and program for trading securities comprising a central host computer system, plural personal computer-based trading stations geographically remote from the host system, a communications network connecting the trader stations to the host system, and a special-function keypad attached to the trading station for interacting with the system. The host system comprises plural mainframe computers which execute real-time programs for assembling bids and offers into finalized transactions. The trader stations each execute local software in real-time to provide different transaction display, analysis, and execution functions, and communicate in real-time with the central computer using the data communication network to interchange bid, offer, and other transaction data.

Computer software operating on interconnected computer and electronic hardware provides an automated trading market according to the invention, having the following general features. First, a continuous auction market is provided in the central computer and all orders in the market are live until executed or canceled. When an aggressive order to buy or sell is entered into the market and a transaction order execution occurs, the next orders in price-time priority immediately become the best in the market and available for execution.

Trading screens of the local trader stations automatically display those issues that have activity in the market and have executable orders available. However, the central market processor simultaneously supports multiple markets of diverse issues each with its own trading rules and trading hours. The trading stations can access multiple markets under the control of each individual market.

Using the trader station disclosed herein, a trader can construct a "personal page" of issues that he has selected to track, and while the personal page is displayed, the trader may exercise all the functions of entering, executing, and canceling orders. Issues can be selected from any market to which the trader has valid security access.

Accordingly, one object of the present invention is to provide an automated trading system making use of an interactive keypad for transactions in securities markets.

Another object of the present invention is to provide a system for accepting bids and offers, and executing transactions, in multiple diverse markets from a single trader station with an interactive keypad.

BRIEF DESCRIPTION OF DRAWINGS

FIG. 7 is a diagram showing the screen display of the Personal Page generated by the trader station program of the present invention.

FIG. 8 is a diagram showing the screen display of the Bills Page generated by the trader station program of the present invention.

FIG. 9A is a diagram showing the screen display of the Active Government Off-the-Run Page generated by the trader station program of the present invention.

FIG. 9B is a diagram showing the screen display of the Off-the-Run Coupon Index Page generated by the trader station program of the present in vention.

FIG. 9C is a diagram showing the screen display of the Bulletin Board Page generated by the trader station program of the present invention.

DETAILED DEsCRIPTION OF PREFERRED EMBODIMENTS

I. INTRODUCTION

Figure 1:
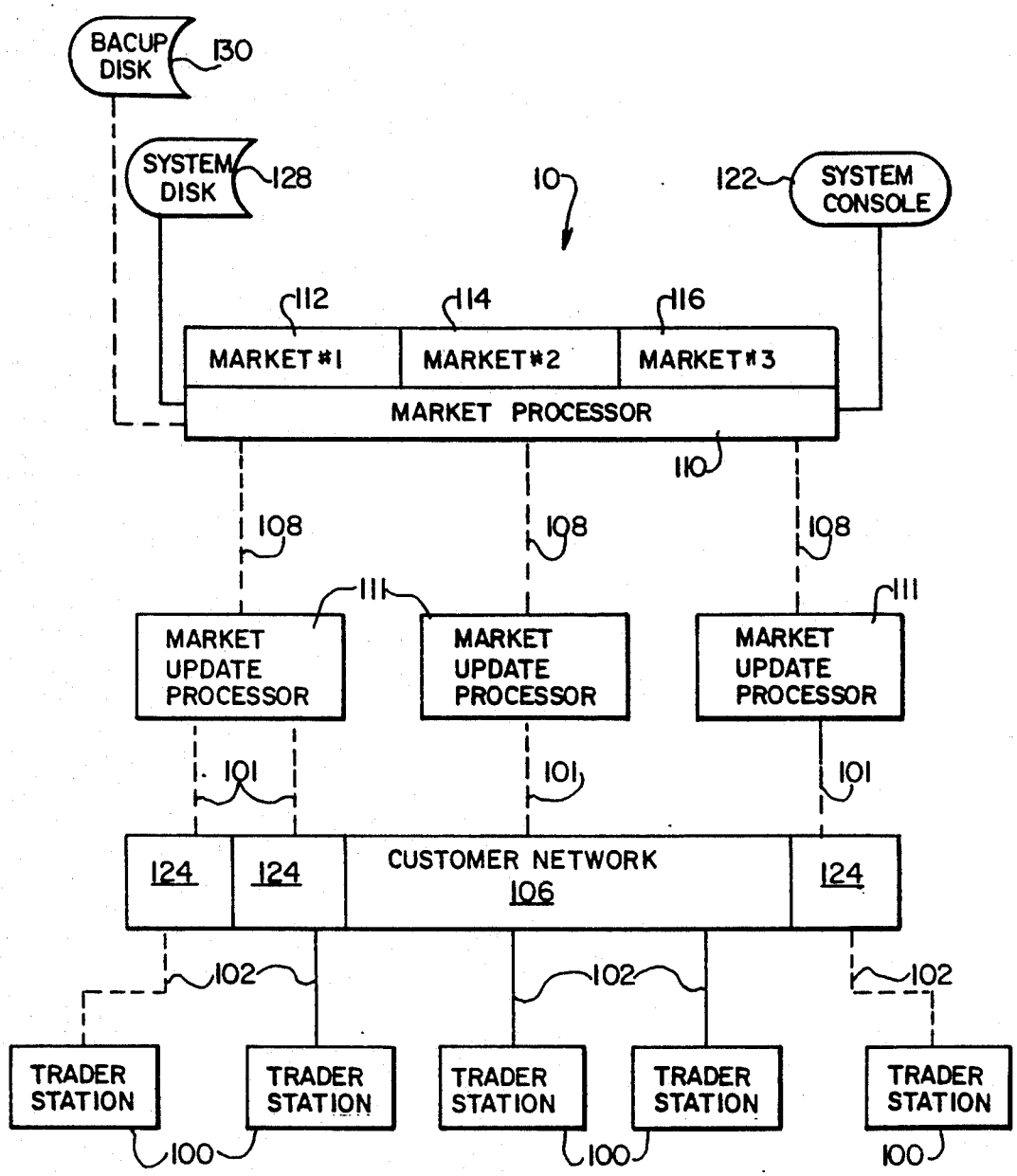
FIG. 1 is a block diagram showing hardware components of the trading system of the present invention.

In the following discussion, specific terminology is used for the sake of clarity. However, the detailed description includes all technical equivalents which accomplish substantially the same function using substantially the same elements operating in a substantially similar manner. This specification also uses a specific typographical convention to designate keystrokes executed on the system keypad disclosed herein. Keys are indicated by a key name enclosed in square brackets. The key names refer to key name labels used on the keypad; sometimes these labels include abbreviated words for indicating the key function. For example, [Enter] refers to the key labeled "Enter." Likewise, [Pers Page Select] refers to the key labeled "Pers Page Select," which means "Select for the Personal Page."

The present invention finds application to a system for buying and selling fungible items, such as Government securities in the secondary market. However, the teachings of the present invention may be applied to any fungible items, such as stocks, bonds, puts, calls, straddles, commodities, and foreign exchange instruments, to name a few.

Government securities, including Treasury bills, bonds and notes, are initially sold at auction by the Government to a relatively small group of major dealers and banks comprising the "primary" market. The secondary market comprises dealers, banks and brokers which buy and sell Government securities after original issuance for their own accounts or for customers.

The present invention uses generally conventional parlance and formats for displaying Government security prices and attributes. This format system is explained in detail in a bulletin entitled "Fedpoints Seven: Understanding U.S. Government Securities Quotes," distributed by the Federal Reserve Bank of New York and reprinted in James F. Tucker's "Buying Treasury Securities at Federal Reserve Banks," a publication of the Federal Reserve Bank of Richmond, both of which are incorporated by reference herein. Each bill, note or bond, broadly referred to as an "issue," is identified by six groups of numbers in typical financial media reports. The first group of numbers identifies the issue by interest rate expressed as a percentage. The second number identifies the issue by maturity date in the form of month/day/year. A one-letter abbreviation is appended to the maturity date to designate the type of security; for example, a designation 11/15/91-N refers to a note having a maturity date or due date of Nov. 15, 1991, where the "N" means "note."

The next group of numbers is the bid price, i.e., a price a buyer is willing to pay for the issue. The "ask" price is the price the seller is seeking for the security. Both numbers are abbreviations, using a 32-point fractional scale fully explained in the Fedpoints bulletin. For notes and bonds, ask prices are always higher than bid prices.

Following the ask price is the difference between the current-day bid price and the listed bid price of the preceding business day. A plus sign may appear t.o the right of the price or its change, most frequently on the most active issues. It means that dealers are quoting the issue in 64ths of a point, rather than 32nds. Finally, the "yield" figure indicates the interest rate which the buyer would earn if the security was redeemed on its maturity date.

As noted in the Fedpoints bulletin, and in the Tucker publication at page 31, Treasury bill numbers have different meanings than those for notes and bonds. These different meanings are displayed and accounted for in the display capability of the present invention.

II. System Architecture

The architecture and organization of the components through which the inventive system provides an automated securities market trading system are described in this section.

A. Hardware Architecture

1. General Components

FIG. 1 shows the overall hardware architecture of a computer automated securities trading system 10 according to the present invention. Plural trader stations 100 are provided and are physically located in the offices of securities traders. Trader stations 100 are linked via conventional network communication cabling 102 to a customer computer network 106. The network cabling may be local hardwired cabling, local telephone lines, or a conventional modem and telephone line connection. The network 106 serves as an intermediary between remote trader stations and the remainder of the trading system. Network 106 comprises plural regional network nodes 124, each of which conventional nodes 124 may be a separate mainframe computer system and communications system connected to one or more trader stations in conventional manner. The network 106 controls the flow of information between a trader station and the remainder of the trading system.

As is discussed more fully below with reference to FIG. 2, a central processing unit 150 of the trader station 100 shown in FIG. 1 is used to execute a local trader station computer program which provides a variety of display and communication functions discussed in detail below. The disk storage device 154 preferably comprises a conventional Winchester-type fixed disk drive, preferably of 20 megabyte capacity or more, and is additionally used to store program information and data files used in processing market transactions. Thus, the trader station 100 serves as a "smart" terminal capable of executing a program independently, but relying upon the mainframe market processor computers 110, 111 for actual execution of trades and for issue data.

When the trader stations 100 are physically located distant from the processor 110, it is preferable for the trader stations 100 to communicate using a local telephone line 102 to connect with a network 106. As is known in the art, modems (not shown) in network 106 establish an independent telephone link 101 with a market update processor 111 and through lines 108 to market processor 110.

As further shown in FIG. 1, the market processor 110 is provided and preferably comprises a mainframe computer such as any model of the VAX family made by Digital Equipment Corporation. One or more system consoles 122 are connected to processor 110 and enable operator communications with processor 110 in known manner. The system also includes a system disk 128 for storing the system software and data files. A backup disk 130 is provided to maintain the integrity of the system software and data files. The market processor 110 is provided with processing capability sufficient to support plural market processes 112, 114 and 116 running simultaneously in processor 110. Additional market processes may be added if additional computing power is added to processor 110. Each market 112, 114 and 116 is active in a particular commodity; for example, market 112 may process transactions related only to Treasury bills. Market 114 may relate only to Treasury Notes. Thus, each class of securities is designated a different market and operated upon by a different market processor. At the same time, the markets may be segregated to process transactions related to different items, such as common stocks, corporate bonds, and commodities. Further, each of the market processes is configured to carry out the rules of that particular market and to observe the hours of operation of the market.

Preferably a separate market update manager processor 111 is provided for each market 112, 114 and 116, and comprises a discrete VAX-class mainframe computer interconnected by lines 108 in known manner with market processor 110. The update manager processor 111 runs an update management program used to "broadcast" or communicate changes in issue attributes to both the trader stations 100 and the market processor 110.

The communication links 102 between the trader stations 100 and the network 106 are maintained in a continuously active state. Further, the links 101 and 102 between the trader station, the customer network, and the processor 110 are also continuously kept open. When the software running on market processor 110 detects a failure of the market processor 110, the market update processor 111 or the trader station 100, the market processor 110 automatically attempts to reestablish the connection with the trader station 100 and/or restart the processor 110 through an initialization program. If the trader station 100 fails or the communications link fails, the market processor 110 continues to deal with the remaining active trading stations. The down trading station then tries to reestablish contact with the market processor.

Figure 2:
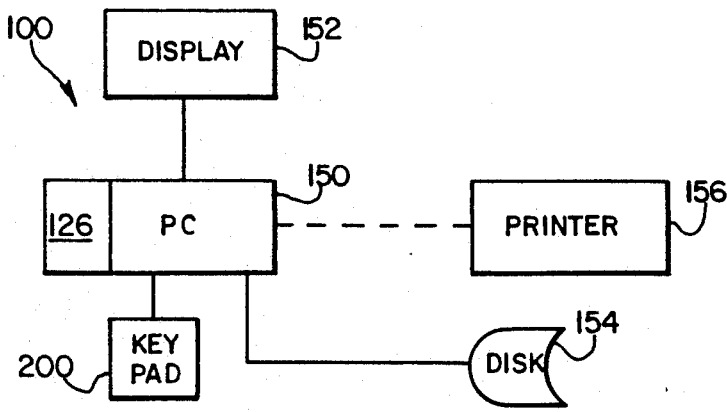
FIG. 2 is a block diagram of hardware components of one trader station of FIG. 1.
Figure 3:
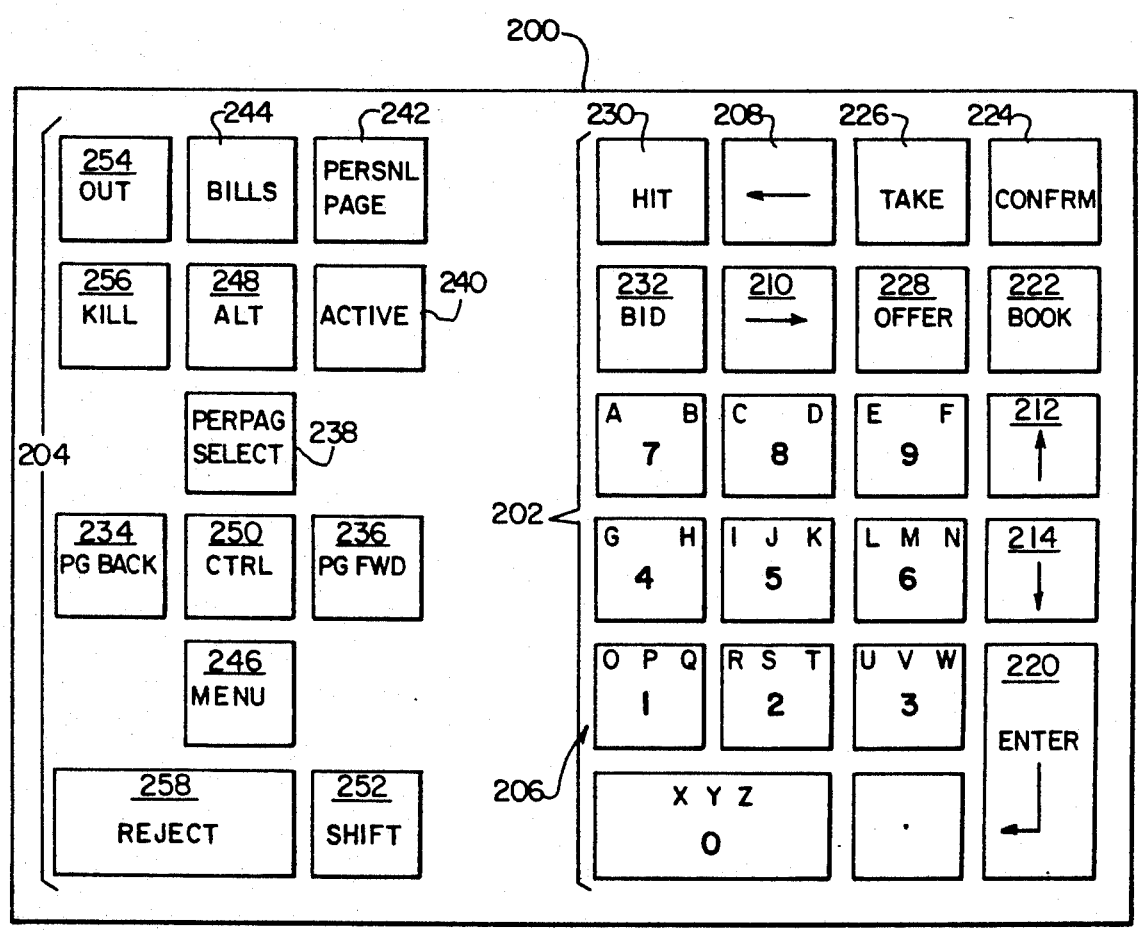
FIG. 3 is a diagram of the keypad of the trader station of FIG. 2.

As shown in FIG. 2, each trader station 100 of system 10 preferably includes a personal computer 150 (such as an IBM PC, PC/XT, PC/AT or equivalent), a CRT display unit 152, random access memory 126, a mass storage device 154 such as a Winchester-type fixed disk drive, and a printer output device 156. The typewriter-style keyboard ordinarily used with IBM PC-class computers is preferably not used with the trader station 100; rather, the trader station 100 includes a keypad 200 having special keys shown in FIG. 3.

2. TRADER STATION KEYPAD

Keypad 200 has a plurality of single-pole, single-throw momentary contact pushbutton keys 208 through 258 which enable transactions to be completed with a reduced number of key strokes. In a preferred embodiment, keypad 200 may be a rapid data controller keypad sold by Touchstone Technology, Inc. of Rochester, NY, under the name TOUCHSTONE 2. The keypad 200 contains two main key clusters: A numeric/control cluster 202, and a screen select cluster 204. The numeric cluster 202 includes a conventional 10-digit numeric key set 206, and four cursor movement keys including left-arrow key 208, and rightarrow key 210, and up-arrow key 212, and a down-arrow key 214. As is discussed in detail below, the cursor movement keys 208 through 214 facilitate selection of items on the trader stations screen when the trading station softWare is running. A conventional [enter] key 220 is provided which is used to select options when the trader station software is running.

Immediately above the numeric keys 206, a cluster of six control keys 222, 224, 226, 228, 230 and 232 are provided. The functions and uses of these keys are discussed more fully below in the description of the operation of the trading system. In summary, the [Book] key 222 operates in toggle fashion to turn the book display on and off. The [Confirm] key 224 has plural uses described below. The [Take] key 226 is used to accept an offer previously made on a particular transaction. The [Offer] key 228 is used to enter a new offer for a particular issue. The [Hit] key 230 is used to accept a bid price previously entered against a particular issue. Finally, the [bid] key 232 facilitates entry of a new bid amount for a particular security.

The control key cluster 204 contains several keys which control display of information on the trader station CRT unit 152. For example, the [Pg. Back] key 234 enables the trader to scroll backwards through plural pages of securities information. In contrast, the [Pg. Fwd] key 236 enables the trader to scroll forward through plural pages of information.

The [Pers Page Select] key 238 activates the personal page display, discussed more fully below. The [Active] key 240 activates the page which displays "active" market issues. The [Pers Page] key 242 enables the trader to activate and display a "personal page" of issues selected from the active issue display. The [Bills] key 244 similarly activates a display of bill issues. The [Menu] key 246 enables activation and display of the main program menu on the trader display unit 152.

Three keys in cluster 204 operate as "modifier" keys. Specifically, the [Alt] key 248, the [Ctrl] key 250, and the [Shift] key 252 enable the operator to accomplish specified operations when the keys 248, 250 or 252 are held down and another key is simultaneously pressed. For example, when the [Ctrl] key 250 is held down and the [Pg Fwd] key 236 is pressed, the trader station will display the next page format forward in the display. Thus, the [Ctrl] key 250 acts as a "accelerator" key, enabling the operator to quickly jump to specified format pages in the display. Similarly, the [Alt] key 248 and the [Shift] key 252 cause specified operations to occur when used in conjunction with another key. These operations are discussed in detail in the section describing the operation of the trader station, below.

Three keys in cluster 204 enable cancellation of selected bids, offers or transactions. Specifically, the [Reject]key 258 enables the trader to stop processing and cancel a selected transaction before it is actually entered into the trading system. The [Kill] key 256 enables cancellation of all entered bid(s) or offer(s) in a selected issue or entered bid(s) or offer(s), provided that the bid(s) or offer(s) was/were entered by the same trader attempting to use the "kill" function. Last, the [Out] key 254 is used to cancel all open orders entered by the trader using the "Out" function.

The trader station keypad 200 replaces the conventional typewriter-style keyboard of a conventional IBM-compatible Industry Standard Architecture (ISA) computer. Each key on keypad 200 corresponds to a key on the conventional type-writer-style keyboard. Most keys of keypad 200 are mapped to lower case alphabetic keys of conventional IBM computer keyboards. Preferred key mappings of keypad 200 appear in Table 1 below:

TABLE 1

| Keypad Key Mappings | |
|---|---|
| Keypad 200 Key | Standard Key |
| [Out] | q |
| [Kill] | k |
| [Bills Page] | r |
| [Pers Page] | p |
| [Alt] | ALT |
| [Active] | e |
| [Per Page Select] | a |
| [Menu] | m |

TABLE 1-continued

| Keypad Key Mappings | |
|---|---|
| Keypad 200 Key | Standard Key |
| [Pg Back] | z |
| [Pg Fwd] | f |
| [Reject] | ESC |
| [Shift] | LEFT SHIFT |
| [Ctrl] | CTRL |
| [Hit] | h |
| [Take] | t |
| [Bid] | b |
| [Offer] | o |
| [Confirm] | c |
| [Book] | d |
| [Enter] | RETURN |
| [Up Arrow] | y |
| [Down Arrow] | v |
| [Right Arrow] | s |
| [Left Arrow] | DEL |
| [0] | F10 |
| [1] ... [9] | F1 ... F9 |
| [.] | g |

Other mappings of keypad 200 keys are possible and are contemplated.

B. Software Architecture

1. Overview Of Software Components

Figure 4:
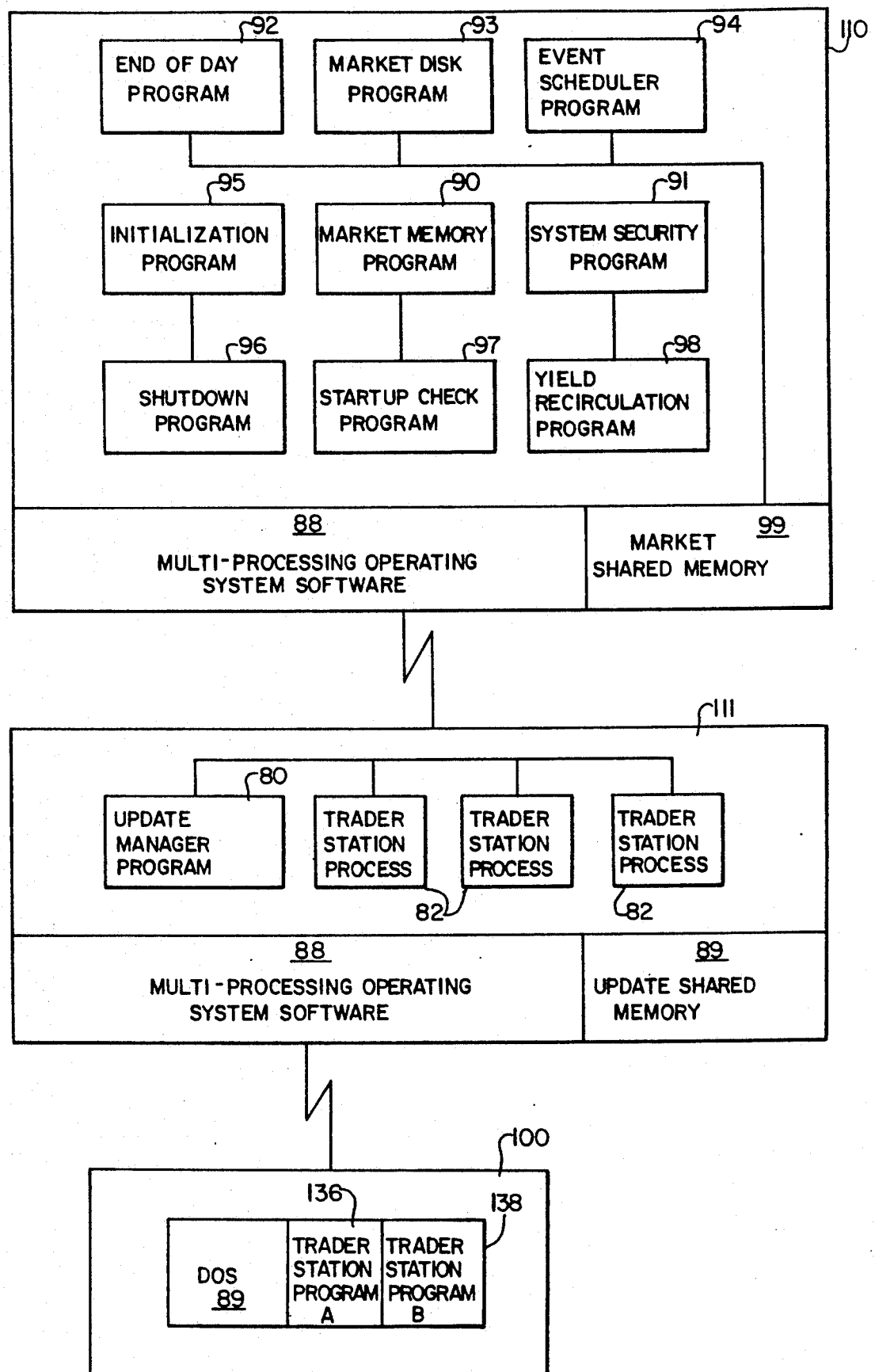
FIG. 4 is a diagram of the software components of the system of FIG. 1.

Attention is now invited to FIG. 4 which schematically illustrates the computer program or software components of the system 10. Market processor 110 and market update processor preferably run under basic control of the VAX/VMS operating system, preferably version 4.7 or later, which includes multi-processing operating system 88. The multiprocessing operating system 88 permits the VAX to operate more than one computer program at the same time. If an alternative operating system is used the operating system must support multiple software processes, each of which comprises a complete operational copy of a stored program. One set of market processor programs 90 through 98 reside in and run on market processor 110. Trader station PC programs 136 and 138 reside in and run on the trader stations 100 under the normal PC disk operating system (DOS) 89. Market processor 110 runs the following programs: a market memory program 90; an end-of-day program 92; an event scheduler program 94; a shutdown program 96; a start-up check program 97; a system security program 91; a market disk program 93; an initialization program 95; and, a yield recalculation program 98. The update manager processor 111 runs an update manager program 80 and a plural trader station processors 82. Programs on the update manager processor and the market processor 110 are controlled by the multi-processing operating system software 88.

Preferably both the market processor programs and the trader station programs are implemented in a compiled version of the Pascal computer language, but other language implementations are contemplated.

2. Market And Update Processor Programs

To start-up system 10, start-up check program 97 is run. Program 97 examines dates stored in market-shared memory 99 and a system calendar data file on system disk 128 to determine if the current date (referred to herein as "today's date") is a valid start-up date, or if a restart of the system is to occur. Operation of program 97 ensures that for a new start-up to occur, the end-of-day job stream represented by end-of-day program 92 was completed normally. If the end-of-day job stream including program 92 did not complete, start-up check program 97 prevents another start-up from occurring.

The initialization program 95 establishes the running environment for the trading system. Under one routine, program 95 tests whether the processor 110 is being restarted during an active trading day. If so, program 95 calls a routine to restart processing. If not, then program 95 initiates start-up processing in order to initialize data structures to begin a new trading day.

Market disk program 93 performs all disk-related processing for the trading system 10 with system disk 128 and backup disk 130. Incoming messages to market disk program 93 are each pre-fixed with unique identification codes. Reply messages from program 93 contain the identification codes of the originating process.

The market memory program 90 performs all memory-related processing within the trading system 10, including receipt of messages, transaction processing, and reply to the trader stations 100 via trader station processes 82. Upon receipt, incoming messages from other programs or processes are combined with a pre-fix which is a unique identification ("ID") code. Reply messages from program 90 also contain matching originating process ID codes. All messages are recorded on input and output log data files on disk 128, and on disk 130, to provide an audit trail and to facilitate restart of the system 10 and recovery from system 10 failure. Further, a unique timestamp is assigned to each transaction logged to the input and output log data file on disks 128 and 130.

Three types of messages are processed by program 90: Internal, External and Incoming. Internal messages are generated by program 90 itself and are always processed first. External messages are queued outgoing responses to trader stations 100 via trader station processes 82 and are sent before processing the next incoming message. Incoming messages are requests from trader stations 100 via trader station processes 82 relative to the active market.

Each incoming request contains a unique transaction code. The transaction code, in most cases, corresponds to one particular subroutine in market program 90 which processes the request. Validation of data within the incoming message is also performed; the type of validation undertaken corresponds to the type of transaction.

Most requests generate one or more responses or outgoing messages. If data validation fails for a particular message, a validation failure response (also known as an edit check) is sent immediately. In contrast, order-related responses are queued so that order processing is not delayed. The following classes of message requests, also called transactions, are preferably processed by program 90:

a. CONTROL:
  1. Log-on   (Trader and Node)
  2. Log-off   (Voluntary or Involuntary)
  3. Market State   (Open, Subject, Closed, Unavailable)
  4. Issue Enable
  5. Issue Disable
  6. Special Broadcast
  7. New Trader
  8. Update Trader
  9. Issue Update
b. DOWNLOAD:
  1. Display Map Download -continued
  2. Market Download
  3. Trading Date
c. LIMIT ORDER:
  1. Limit Order
  2. Limit Order Price Adjustment
  3. Kill   (Cancel all Bid/Offer/All Orders in Specific Issue for Trader)
  4. Out   (Cancel all Bid/Offer/All Orders in Market for Trader)

Order information is stored in memory using linear doubly linked lists also referred to as chains. Preferably, separate chains are used for bids and offers, and separate bid chains and offer chains are constructed for each active issue. A pointer to each chain header, or first link, is provided. The characteristics of doubly-linked list data structures, and computer program algorithms used to manipulate such data structures, is well known in the art; however, Pascal implementation details of such data structures are provided in Donald E. Knuth's text, "Algorithms+Data Structures=Programs," (Addison-Wesley Publishers, Menlo Park, CA).

Shared memory 99 is checkpointed (written to system disk 128) after a designated number of incoming messages have been processed and after any restart or recovery is performed.

Error logging is recorded both by a central error logger program, and the process log data file, which records detailed information about anticipated errors and/or edit checks. Fatal error recovery is accomplished by the initialization program 95 building restart data files and a related timestamp file from the input and output transaction log files. The restart data files contain transactions extracted from the transaction log files since the last shared memory checkpoint. When the Market Memory program 90 is started, it checks for the presence of the restart files. If they are present, the transactions in the restart files will be processed sequentially in order to re-build the exact state of the market prior to the fatal error. Normal processing is then resumed.

The Event Scheduler program 94 schedules daily events for the trading system 10 and processes such daily events in chronological order. Program 94 runs in the "background" with respect to market processor 110, and program 94 has capability to change the operational state of market memory program 90 according to a predetermined time schedule.

A daily event schedule file is stored on disk 128 and is loaded into shared memory 99 by the Initialization program 95. Typical events are opening and closing the system. The last event of every day is to shut down the Market process and start the end-of-day operations.

System security program 91 of FIG. 4 handles securityrelated processing for user operating trading system 10. Incoming messages must be pre-fixed with one of four unique identification codes which designate what type of security request is represented by the message. Reply messages from the program contain the originating identification codes.

The end-of-day program 92 performs several operations for the trading system 10 ordinarily conducted only at the end of the trading day.

Shutdown program 96 shuts down the trading system 10 by sending a series of shutdown messages to all active processes. Program 96 is run as part of the end-of-day processing cycle, and is ordinarily triggered by a daily event record read by event scheduler program 94.

Among the software routines in the software found in the financial trading system are the following:

FTCHECK—FT Check Date For Start-up or Restart—This program is run as the first step in a system start-up and will examine dates in shared memory and the FTDATE file to determine if a valid start-up or restart condition exists. In order for a start-up or a restart to occur, an FTEND program 92 and the shutdown program 96 must have completed normally. If the FTEND did not complete, this program prevents another start-up from occurring.

FTCONNECT—Trading Station Connection Program—This program establishes a connection between a trader station 100 and an update manage processor 111 via customer network 106 prior to involving trader station process FTTRDSTN 82.

FTDATE—FT System Date Calendar Program—This program allows a user to view and/or for maintain a file of order entry open and close dates.

FTEVNSCH—FT System Event Scheduler Program—This program found in the Event Scheduler program 94 schedules daily events for the financial trading system. The program processes daily events in chronological order. Daily event records are read in one at a time from the daily event file. The program then schedules a timer to alarm at the specified time when the event should occur and alerts the financial trading system with a transaction to the central process. The last event of every day is to shut down the central process and start the end-of-day operations.

FTEXERPT—FT Execution Report—This program will produce a list of executions beginning with the most recent execution.

FTINIT—FT Initialization Start-up Program—This program found in the Initialization progra 95 determines the running environment for the FT system and initializes corresponding data structures for the process. The program performs one of the following depending on the current status of the system:
1) If status is Begin-of-Day, the program creates empty input and output transaction log data files on system disk 128. Shared memory data are initialized to reflect Begin of day condition.
2) If status is Restart, the program positions input and output transaction log files to the next available slot.

FTISSENA—FT Issue Enable/Disable Program—This program will enable or disable an issue in today's issue market table.

FTISSSAV—FT Save Issue Price Information Program—This program will save execution prices from shared memory 98 to the issue master file on system disk 128, it is run as part of the end of day process 92.

FTMENU—FT Intelligent Menu Program—This program will build a custom menu for each operation user based on terminal type and security level. After initializing terminal messages and global variables, the program compiles a list of valid menu items for the user. If there are no valid items, the user is informed and logged off the system. If there is only one valid item, that item will be run automatically. If there is more than one valid item, a list of choices is displayed on the screen and the user is prompted for selection, which will be the next program to run.

FTMKTCLOSE—FT Change Market Status To CLOSED Program —This program will prompt to change the status of the market to closed.

FTMKTDSK—FT Disk Data Base Manager—This program performs all disk-dependent processing within the trading system 10. Incoming trader transactions are pre-fixed with unique ID codes. Reply messages from the program contain the originating trader ID codes.

FTRPTSCH—FT Report Scheduler—This program processes all user report transactions and schedules a report generator job in a report batch queue. The program accepts user transactions from channel to the central communication process and sends back reply messages via the same channel. Incoming user transactions are pre-fixed with unique ID codes. Reply messages from the program contain the originating user ID codes.

FTSHRMEM—FT Shared Memory Definition Module—This module contains the financial trading order processing shared memory sections 99.

FTSTATUS—FT Change Market Status Program—This program allows an operator to alter the status of the market to OPEN or SUBJECT.

FTTRDSAV—FT Trader Maintenance S.M. Update Program—this program will update the trader master file on disk 128 with trader information in shared memory 99.

FTTRDSTN—FT Trading Station Communication Program—This program 82 handles all communication between a remote trading station 100 and the host processes on the VAX system.

FTTRDSUM—FT Trader Summary Program—This program will report total executions for all traders.

FTUPDDBM—FT Market Update Manager—This program 80 distributes market update messages to all trading stations connected to it.

FTUPDSHR—FT Market Update Shared Memory Definition Module—This module contains the market update shared memory section 90.

FTMSGMGR—Central Task to Task Communication Program -This is the central communications program for the trading system 10. Specifically, this program functions as an agent for task-to-task communication messages among participating processes. The program is also responsible for maintaining message queues for each process in an asynchronous environment.

FTYLDDBM—Yield Recalculation Program—This program 98 calculates a new set of yields for issues that the market memory program 90 determines have had significant price movement, such that the current price for the issue has moved near to the end of the prices for which yields were last calculated.

The calculations of yields are performed according to formulas appearing in "Standard Securities Calculation Methods: Current Formulas for Price and Yield Computations," by Bruce M. Spence, Jacob Y. Graudenz, and John J. Lynch, Jr., a publication available from the Securities Industry Association (SIA), 20 Broad St., New York City, NY.

3. Trader Station Program Descriptions

Two programs govern operation of the trader stations 100 in the system 10: Local software running on the PC trader station, known as the Trader Station PC Programs 136 and 138; and a Trader Station VAX Program 82 which is run as a plurality of processes simultaneously active on processor 111. Program 82 facilitates all communication between a trading station 100 and processes on the main system 110 and/or on the update processor Program 82 handles message communications, sending and resending as necessary, and converts ASCII data from the remote trading station to binary and vice versa. Thus the two main functions performed by program 82 are communications and data conversion.

Update Manager progra 80 of FIG. 4 distributes information about active issues in the market to all trader stations 100 connected to it via trader station process 82. The Update Manager Program 80 can send a Market Download (a download of all active issues) to each trader station upon request. Market Updates (a specific issue(s) that has changed) are triggered by an asynchronous system trap (AST) from the Market Memory process and are automatically sent to all on-line Trader Stations. Update Manager progra 80 also initializes the shared memory area 90 on the Update Manager 111 computer. This shared memory area is accessed by the Update Manager program 80 as well as all Trader Station process 82 connected to program 80.

The trader station 100 includes two programs 136 and 138 which run on the remote trader station 100. Program 136, called PC TRADER PROGRAM A, is responsible for establishing communications with the regional communications node, signing in the user and downloading any volatile market information. At the end of this process, the remote trader station 100 will contain an up-to-the-minute image of the current market and control is passed to program 138 (PC TRADER STATION PROGRAM B), which will allow the trader to monitor the state of the market and to enter orders in a manner to be described hereinafter.

Within the market update processor 111, the update manager program 80 controls and orchestrates all operations including interaction with the multi-processing operating system 88, the shared update memory 90, and the various trader station processors 82. The update shared memory 90 holds the latest prices for the three best bids and offers for all issues that are to be traded. Each trader station 100 communicates with the market processor through one of the trader station processes 82. Thus, each market update processor 111 will include a trader station process 82 for each trader station that is linked to it through communications link 102.

4. The Security Issue Master File

This section provides a description of the structure of the security issue master data file on system disk 128. This file contains centralized basic information about each issue which can be traded on the system of the invention.

The file has an open ended capacity and a flexible record format that can accommodate various issue types. The open ended capacity means that the file can expand to an indefinite size and is only limited by disk capacity. The flexible record format permits storing information related to different issues in variable length records.

To maintain the integrity of the data file, a separate update program is used to add, change and delete issue file data. No changes to the issue file may be made from the inventive trader stations. All changes to the file are captured in a transaction log maintained at the site of the market processor 110. At the start of each trading day, the master file is copied to a production area of volatile memory within market processor 110. Access is by issue number or by issue description. A description of the preferred file elements is given in Table 2:

TABLE 2
Security Issue Master File Definition

| Instrument Group Code | | |
|---|---|---|
| Government | Treasury bills | (11) |
| | Notes and Bonds | (12) |
| | Agency Bonds | (13) |
| Mortgage Backed | TBAs | (21) |
| | Bonds (passthru) | (12) |
| Municipals | Bonds | (31) |
| | Notes | (32) |
| Corporates | Bonds | (41) |
| | stock | (42) |
| | ADAs | (43) |
| | Warrants | (44) |
| | Rights | (41) |
| Currencies | Foreign Exchange | (60) |
| Money Markets | Federal Funds | (61) |
| | Eurodollars | (62) |
| | | (70) |
| Options | | (80) |
| Futures | | |
| Issue Number | CUSIP or other number that uniquely identifies the (ACCESS KEY) instrument. | |
| CUSIP Number | The industry standard security identification number comprised of: A six digit issuer number. An issue code of two alphanumeric characters. A modulo ten check digit. | |
| When Issued Code | Is appended to the and of the CUSIP which enables preliminary trading in the issue until the actual issue is released for normal trading. | |
| Coupon Code | A coupon bearing instrument. | |
| Space | No coupon. | |
| Issuer Mnemonic | An alpha code up to six characters which identifies the issuing designation. | |
| Trading Basis | "$" Dollar "D" Discount "Y" Yield | |
| Increment of Price Code | | |
| "100" | 100s | |
| "200" | 200s | |
| "008" | 8ths | |
| "016" | 16ths | |
| "032" | 32nds | |
| "064" | 64ths | |
| "128" | 128ths | |
| "256" | 256ths | |
| Price Display | A value which will align fractional price displays Adjustment for the given price increment. | |
| Coupon Rate | Coupon interest rate (xx - xxx). | |
| Maturity Date | YYYYMMDD | |
| Issue Date | YYYYMMDD | |
| Dated Date | YYYYMMDD | |
| Call Date | YYYYMMDD | |
| Strike Price | Option strike price. | |
| Issue symbol Identification | A symbolic name for the issue that will uniquely identify it. | |
| Issue Description | A variable number of lines that further describe the issue. | |
| Time Stamp | Date and time that record was last changed. | |
| Comment Field | Free form field that contains comments that would assist in file maintenance. | |

The Market Memory Program 90 activates software to add, change and delete the working set of active issues for each market different process 112, 114 and 116. Since, under certain circumstances, the same issue can be active in more than one market process, unique designation codes are used to keep each issue separate from those in a different market. When selected, an issue is given a unique issue sequence number and a market designation code for the particular market process 112, 114 and 116 that it is going to be used in. Orders entered for an issue in one market are queued separately from orders entered for the same issue in another market. The designation code comprises an Issue Key, which is the industry-standard CUSIP number or long name, and a Market Indicator referring to a particular market chosen from market processes 112, 114 and 116.

C. The Market Process

As described above, central processor 110 of the system 10 is a multi-processing computer capable of supporting several active software processes, each of which comprise a complete operating copy of a compiled Pascal program. In the system 10 one type of process controls most issue trading functions, thereby simulating a prior art securities market, and is, therefore, referred to as "the market process." The following section describes the main features and characteristics of the market process.

The market process simultaneously operates multiple individual markets and handles a variable number of issues within each market selected by activity. This structure allows each market to have a large universe of issues without having to reserve system space for every issue in advance. Issues are brought into the active market process dynamically during the trading day. Further, each market can have its own unique rules and operating hours.

The market process assigns a reference number (starting at 1) to each issue as it is actively selected by any market on the system 10. A record is created at that reference slot which contains all the information about that issue and the identity of the selecting market. An issue array is maintained for each market of the issues selected by each market. An issue can be selected by more than one market but only once within a market. The high volume issues are designated in selection data files on system disk 128 and get assignments at start-up, while all other issues are assigned at the time o selection.

Figure 5A:
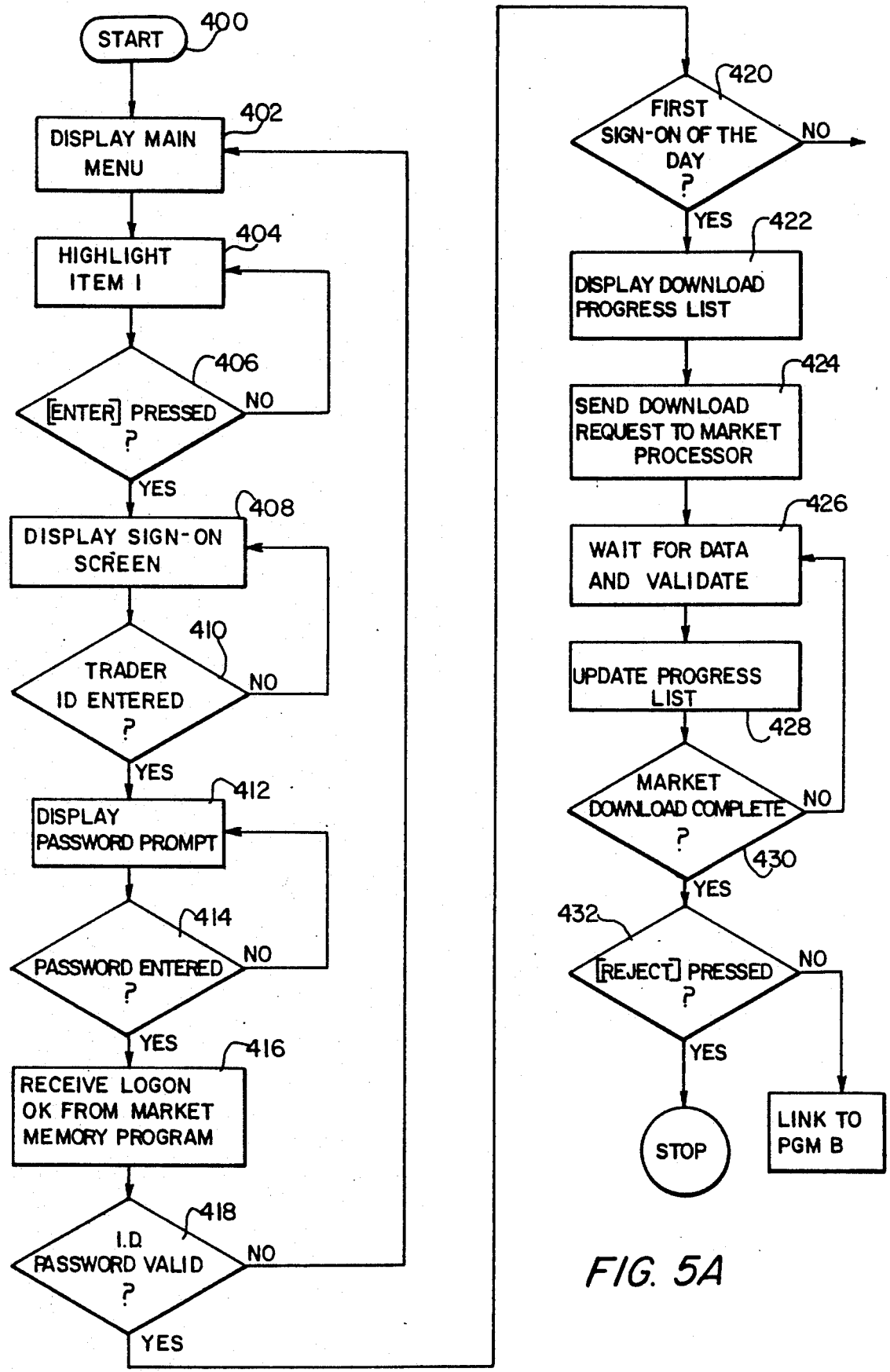
FIG. 5A is a flowchart showing a high-level view of computing steps taken by the local trader station computer system to accomplish system initialization and download.
Figure 5B:
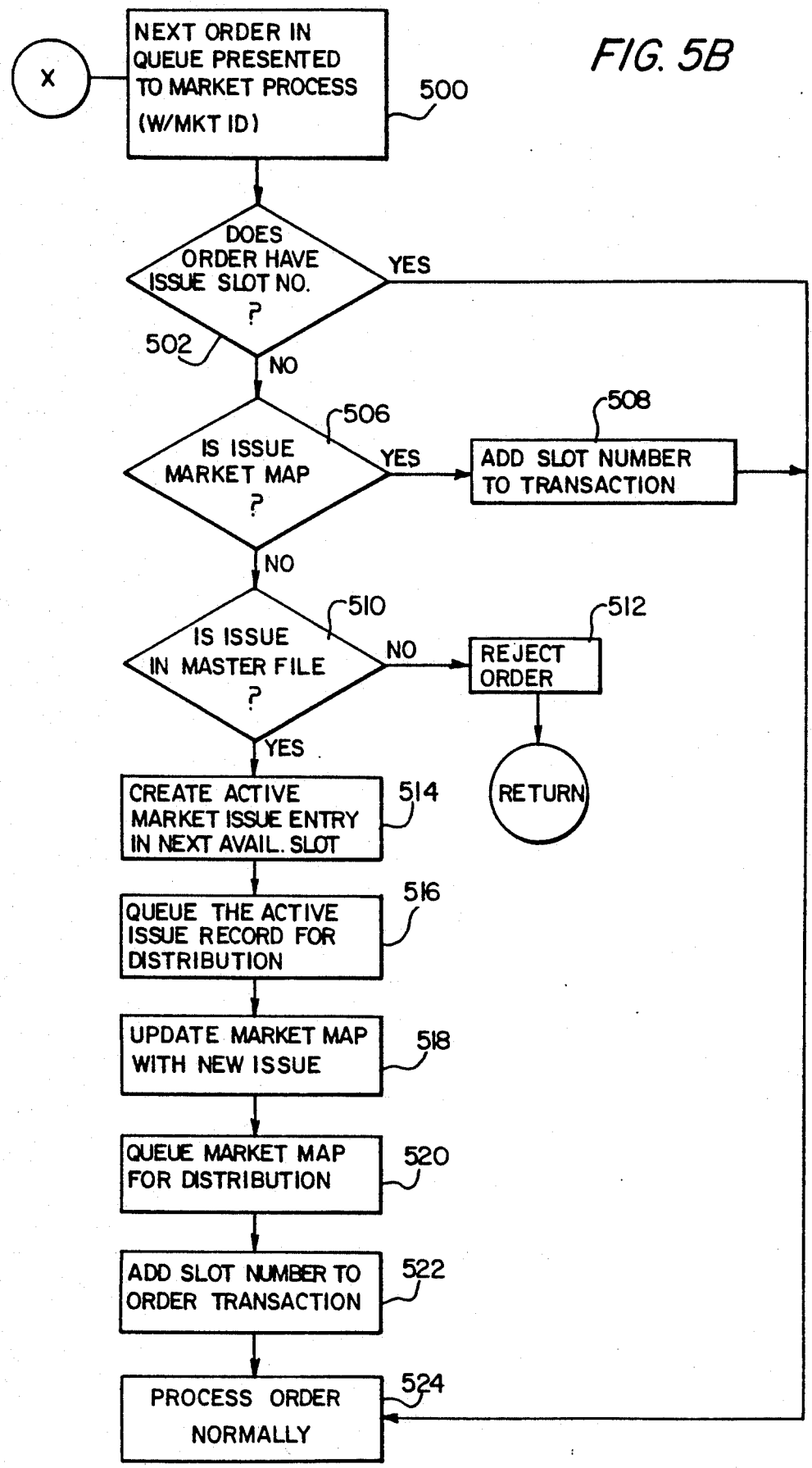
FIG. 5B is a flowchart showing a high-level view of computing steps taken by the system to add a new order to the market system.

Attention is now directed to FIG. 5B which illustrates high-level logical operation of a portion of the market process. The market process manipulates the issue array upon receiving an order from an order queue stored in memory within market processor 110, as indicated in block 500. Each order is presented to the market process with a market identifier appended to the order, so that the market process can determine which market to modify. When an issue has been assigned an active market slot number, an entry is made in the master issue file. Further, if an issue has been assigned to an active market slot, all orders are processed with that number.

As tested in block 502, if an incoming order contains an issue slot number, then the market process can properly reference the issue so control is passed to block 524 in which the order is processed normally. If an issue slot number is absent control is passed to the test of block 506 which tests whether the issue in the order is assigned to the current market map. If so, the order has merely omitted the slot number, and control is passed to block 508 in which the market process will automatically assign the proper slot number to the order request and then process the order normally by passing control to block 524.

If the tests of blocks 502 and 506 are false, then the issue has been omitted from the order request and cannot be located in the current market map. Therefore, through the test of block 510, the market process searches the issue array to determine whether the requested issue can be found. If not, the issue is unidentifiable, and control is passed to block 512 in which the order for that issue is rejected.

If the test of block 510 is true, then the issue is in the issue array but not in the current market map. Therefore, control is passed to block 514 in which a new dynamic issue slot is created in memory, associated with the active market, and a copy of the issue master record is placed in the slot. The new active issue record is also queued for distribution to the trader stations in the step of block 516. Control is next passed to block 518 in which the new slot number is added to the current market map, where the slot number will be available for reference by future orders. The revised market map is queued for distribution to the trader stations in step 520. The new slot number is then appended to the current order request, and the order is processed normally by passing control to block 524.

As issues become active in the market, a record for each active issue is communicated to the trader stations 100. Using the queues noted above, and through the Update Manager Program 80 and trader process 82, a copy of the new issue record and revised market map is sent to all trader stations 100 for each new slot number assigned to identify the issue for that market. This issue record contains an issue sequence number, market identity code, and issue specification data. The records must be received by the trader station 100 in issue number sequence order, because these active issue records comprise a security master file stored on the disk drive 154 of the trader station 100 and all reference to issue identity is by issue number. The exception is the entry of an order in an inactive issue; such entries use the name from the index page. The active issue file in the trader station typically has the following format, assuming a file of only 3 issues:

| ACTIVE ISSUE FILE | | |
|---|---|---|
| Slot number | Market ID | Issue specifications |
| 1 | 1 | TB 05/10/88 etc. |
| 2 | 1 | TB 06/15/88 etc. |
| 3 | 2 | TBA 8.750 |

In this table, each slot number is unique, but both slots 1 and 2 refer to Treasury bills in market number 1. The issue specification comprises all the information about the issue shown in the Security Master Issue File definition table above.

The market processor 110 also creates and maintains a display map in memory of the active issues in each of the different markets. The map references issues by their slot number, and is updated and sent to each station whenever an issue is added to the active set of a given market. The trading station PC programs 136 and 138 use the map to generate market displays on the display 152 of the trader station 100 and to determine display locations of particular issues. Each of the market displays is controlled by the map created by the market processor, except the Personal Page, which is created and maintained within the trader station 100. The display maps are in page and line sequence and comprise a market timestamp code followed by a series of table entries each comprising a display page and line number and an active issue slot number. For trader stations 100 with dealer access, the map of the dealer page is created and maintained within the trading station. The following is an example of the display map format:

| DISPLAY MAP | |
|---|---|
| Timestamp From Market | |
| Page-Line | Slot No. |
| 1-1 | 1 |
| 1-2 | 3 |
| 1-3 | 4 |
| 1-4 | 7 |

In the preceding table, the display map indicates that page 1, line 1 of the trader station display shows an issue having identification data found in slot 1. Similarly, page 1, line 3 displays the issue of slot 4. The trader station always uses the display map with the most recent timestamp, which timestamp is shown at the top of the display map.

III. OPERATION OF THE TRADING STATION

The following discussion describes operation of remote trading stations 100 implementing system software of the present invention.

A. General Operation

Figures 6A, 6B:
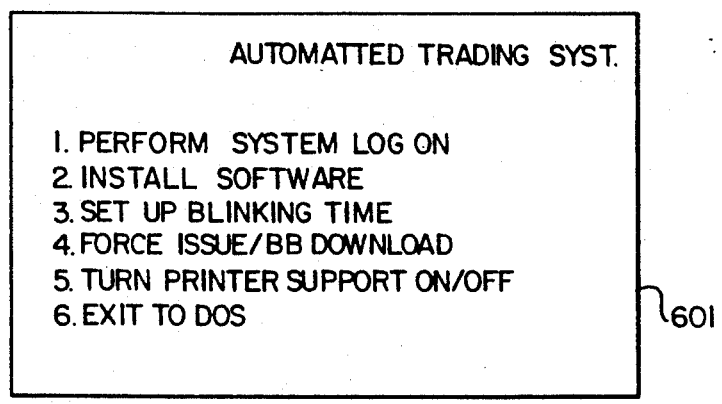
FIG. 6A is a diagram showing the main menu of the trader station program used in the present invention.
FIG. 6B is a diagram showing the Active Government Issue page screen display of the trader station.

Generally, the trading station 100 is always left in an ON condition, because as discussed above the communications link between the central mainframe computer 110 and each trading station 100 is always active. If the trading station 100 has been powered off, the following start-up procedure is followed. First, the trader station PC 150 is turned on by pushing a power switch on the front of the computer. Second, the display 152 is turned on by flipping a power switch on the display 152. In a process known in the art, the PC trader station 100 "boots up" from its system disk 154. Program 136 is activated and under program control, the system main menu screen 601 of FIG. 6A is displayed. All orders and commands are entered using the special function keys on keypad 200 of FIG. 2. Alternatively, a voice recognition unit is contemplated for use to enter order and commands in conjunction with the keypad.

Throughout the following discussion, reference is made to "selection" of options presented by the system software. This selection is accomplished in a well-known manner, by pressing appropriate trader station 100 keyboard 200 arrow or cursor buttons until a desired item is highlighted on the screen. Thus, in response to pressing the keypad cursor buttons, the programs 136 and 138 highlight a different menu option on the screen. Pressing the [Enter] key 220 o the keypad 200 completes selection and activates the option. This manner of option entry is well known in the art.

As shown in blocks 402 to 406 of the flowchart of FIG. 5A, to begin active operations, a user then selects menu item 1 from screen 601. The trader station software passes control to block 408 and the trading station then displays a screen and pauses until the user enters a trader identification number, as shown in blocks 408 and 410 of FIG. 5. The user types in a trader ID, and presses [Enter]. Then the prompt "Password" is displayed. The user types a password, and then presses the [Enter] key. To preserve system security the password is not displayed as the user types. Under program control as shown by blocks 412 to 418, the station 100 enters an ID and a password validation request. This request is received and acted upon by the market memory program 90. If the trader ID and password are valid, the market processor 110 then downloads market information by transferring data over the communication links 101 or 102 between the update market processor 111 and the trader station 100, which acts as a slave during the transfer. This downloading procedure can take up to 5 minutes of real-time.

As indicated in blocks 420 and 422, during the download process, if this is the first sign-on process of the trading day, the download progress list of Table 3 is displayed on the last line of the trader station display 152. This list shows the download sequence of the system 10. A trader can check on the progress of the download sequence by looking at the message line at the bottom of a trader's screen. The numbers will constantly move upward from step until step 10 is reached. When the system is finished downloading, the Active Government Market page is displayed and the trading station is ready to trade.

TABLE 3

Download Sequence

1. Trader Software Version Check
2. Timesync
3. Log-on Request
4. Bulletin Board
5. Load Personal Page Issue Records
6. Issue Specification Download
7. Store Personal Page Issue Records
8. Issue Display Map Download
9. Market Download
10. Check Transaction Timestamps In a preferred embodiment, the trader station 100 utilizes a single basic display format for each of the markets, which is a summary presentation showing twenty (20) issues per page, as exemplified by the screen displays of FIGS. 6B, 7, 8 and 9A. One issue on the display screen is always highlighted using a selection bar having a different background color. This is the "selected issue," to which all order and display functions refer. A highlighted selection bar on the screen can be moved with the up and down arrow keys 212 and 214 or by typing the line number of the desired issue and pressing the [Enter] key.

By pressing a single keypad key 222 labeled [Book], a small display called "the Book" for the selected issue will be displayed in a pop up window on the display screen. The book shows the three best bids and three best offers in the market including cumulative size. The book can be displayed or erased with a single stroke of key 222.

If the trader currently has open orders in the selected issue, another "open book" will show the trader's bids and offers. This "open book" is always shown directly to the left of "the book" and will display up to three open bids or three open offers.

The page screen formats differ from market to market only in the color coding and banner descriptions used for identification. Thus, as indicated in FIGS. 6B, 7, 8 and 9A, pages for different markets use different screen colors and contain different descriptive banners at the top of the screen, to enhance user recognition of each screen.

In each market the trading screen displays only those issues in which there is activity or those issues designated when the market is initialized. Thus, at the start of the trading day, a designated set of issues is displayed on the trading page. Thereafter inactive issues are moved to the end of the trading page, or removed altogether. The sequence of issues displayed on the screen is a predefined sequence for the issue within the market universe. When a previously inactive issue is introduced to the active display it will be inserted in proper sequence.

The trader can construct a "personal page" screen display compiled of any of the issues on the active or off-the-run market(s). Pages selected for the personal page have the same format and functionality that the active market pages have plus continuous display of the trader's active open orders in the market.

The electronic communications link between the trader station 100 and the market processor 110 recognizes an "interrupted communications" state. Ordinarily, the communications link 102 is constantly active; both central computer and trader stations remain "on," and telephone lines connecting them remain open and active. If either the trading station 100 or the phone lines 102 become disabled, the trading station enters the "interrupted communications" state in which the trading station tries to reestablish the connection. The trader is notified of the status, and upon restoration of communication, the systems will automatically refresh and update to return to the operating status prior to the interruption with trading station 100 password locked. When an interrupted communications state is detected all active bids and offers made by the non-communicative trader are canceled, therefore, no active bids or offers made by the non-communicative trader may be consummated into transactions. This feature protects the disabled trader from unwittingly entering into an undesired transaction. Reestablishment of communications is one of the operations carried out by PC program 136. When communications are interrupted the market processor 110 continues to interact with the remaining unaffected trading stations.

Open orders for a given trader are maintained in the local trader station 100. This makes them available for highlighting in any market display as well for immediate review. To enter an order in an issue that is not currently active and displayed on the active market pages, the trader uses the pages for that market and using the arrow keys, highlights the short name of the issue and generates an order for introduction into the active market.

All of the information available in the trader station is displayed in one of six display groups, also known as "page types," shown in FIGS. 6B, 7, 8, 9A, 9B and 9C. Page types include the Active Government Market Page, Active Government Personal Page, the Bulletin Board Page, the Bills Page, the Off-The-Run Page, and the Off-The-Run Coupon Index Page. Within each page type there are one or more "pages." The name of the page type is shown at the top of each page. Actual trading can be done from all pages except the Bulletin Board page. The preferred display fields of each page are described below.

The Active Government Market Page 600 displays market information on 20 active issues at a time and is shown in FIG. 6B. The fields on the Active Government Market Page are described below. The descriptions below also apply to any page where these fields appear.

The "Page name" field 606 contains a description of the display. The "Status" field 602 indicates whether the market is currently available for trading, and may contain the designation OPEN (meaning trading is possible) or SUBJECT (meaning trading is suspended during Federal Reserve Board market intervention). The "Date" field 604 displays the date on which the trades are occurring. The "Time" field 608 displays the current local time. The "Page number" field 610 displays a number representing the screen number of a particular page. Each page can include plural screens. If plural screens are available, a user may display the next screen in order by pressing [Pg Fwd]. The "#" field 612 indicates the screen line number of the issue. The "Issue" field 614 describes the issue. Each different page type shown in FIGS. 6B, 7, 8, 9A, 9B and 9C includes fields corresponding to fields 602 through 610.

The "Bid" field 616 of the page of FIG. 6B represents a proposed buying price for a particular issue and contains two numbers designating the size of the order and the bid price. The "Offer" field 618 represents a proposed selling price for a particular issue and contains two numbers designating the size of the order and the offered price. The "Yield" field 620 displays the interest rate earned to maturity for a purchase of the particular issue, based first on the offer price; if no offer, then bid price, and, if no bid, then last executed price.

The "Last" field 622 displays the last hit or take made on this issue. The "Action" Line 624 displays the action being entered by the trading station. The "OTR" field, available only on the Personal Page, displays the last "off the run" issue that had purchase or sales activity.

For clarity, in FIG. 6B only one line of data is shown in the FIGURE; however, in active trading, the entire screen of 20 lines may contain issue data.

The Personal Page, shown in FIG. 7, permits assembling a list of only those issues in which a trader is interested in trading or monitoring. Thus, in display area 702 the Personal Page displays a subset of issues available in a market or markets. These issues can be added or deleted during the trading day and can be either "active" or "off-the-run" issues. The Personal Page also shows a trader's trading activity on issues selected in the Current Orders field 704. As indicated in FIG. 7, the Personal Page includes a display column 708 for issues, a best bid field 710, and a best offer field 712, and a last execution field 714.

The Personal Page permits a trader to see only the issues the trader is interested in trading or monitoring. In building a Personal Page, issues can be copied from the screens associated with any of the different markets the trader has access to, such as the Active Government Market, Bills, or Active Government Off-the-Run pages.

To copy an issue to a trader's Personal Page, under control of programs 138, a trader executes the following steps. First, the trader moves to the page displaying the issue. Second, the issue is highlighted by using the arrow keys. Third, the [Pers Page Select] key is pressed. Next, the trader is asked to confirm or reject the selection. The trader then presses [Confirm] to copy a selection or presses [Reject] to go back to the display without copying the selection.

To delete an issue from a trader's Personal Page, the following steps are followed. First, the trader moves to the Personal Page by pressing [Per Page Select]. Second, the issue is highlighted using the arrow keys. Next, the [Pers Page Select] key is pressed, and the trader is asked to confirm or reject the selection. The trader presses [Confirm] to delete the selection or presses [Reject] to go back to the display without deleting a trader's selection.

A trader can copy all issues on a page for a trader's Personal Page instead of copying them one by one. A trader can also delete all issues on a trader's Personal Page at one time. To copy all issues on a page, the trader moves to the page which contains the issues the trader wishes to copy. Second, the trader presses [Alt] [Pers Page Select]. Third, the trader is asked to confirm or reject the selection. The trader presses [Confirm] to copy all issues on this page or presses [Reject] to go back to the display without copying the issues on this page.

To delete all issues on a trader's Personal Page, the trader first moves to the Personal Page and presses [Alt] [Pers Page Select]. The trader is then asked to confirm or reject a trader's deletion and can press [Confirm] to delete all issues, or press [Reject] to go back to the display without deleting any issues.

To copy the last active off-the-run issue, the following steps are followed. The last off the run issue that has had activity for the day is displayed in the message line at the bottom of the Personal Page. It is labeled OTR. A trader can copy this issue to a trader's Personal Page to further monitor its activity. To copy the last off the run issue, the trader moves to the Personal Page and presses [Ctrl] [Pers Page Select]. The last off the run issue is displayed on the trader's Personal Page.

Shown in FIG. 8, the Bills Page displays market information for all bills and operates in a manner similar to that for the Active Government Market Page of FIG. 6B.

The Active Government Off-the-Run Page, shown in FIG. 9A, displays markets in "off-the-run" issues. This display is found on the second and succeeding pages of the Active Government Market page type. Issues are shown in maturity order.

The Off-the-Run Coupon Index Page, shown in FIG. 9B, displays all coupon issues in order of maturity. These pages are used to enter orders in "off-the-run" issues. In the example of FIG. 9B, one line of issue data is shown, and a message from the market processor is shown in message line 918. However, the display in FIG. 9B is capable of displaying up to 60 issues per page.

The Bulletin Board page, shown in FIG. 9C, provides a daily record (or audit log) of all orders, acknowledgements, executions, and cancellations generated by the trading station for that trading day. No actual trades may be executed while the Bulletin Board Page is displayed. The time field 1102, shown in FIG. 9C, provides a time-stamp indicating the hour and minute at which the action or transaction occurred. The transaction code field 1104 contains a shorthand indication of the type of transaction executed. A description field 1106 is provided and displays a shorthand notation for each user transaction completed. For example, a bid is designated "BID," and an offer is designated "OFR." Thus, transaction field 1104 indicates internal system events, while description field 1106 provides an indication of what actions were taken by the trader. Further description of the actions noted in field 1106 is provided in the description field 1108, which provides detailed information about the size and maturity date of selected or purchased issues.

A comment field 110 is provided which gives a further indication of the status of a particular transaction. Last, an order ID field 1112 is provided to record the internal system transaction tracking number, which is a unique indicator provided for each transaction.

The Active Government Market, Bills, and Personal pages are displayed by pressing the corresponding key on the keypad, labeled [Active], [Bills Page], and [Pers Page], respectively. To display the Active Government Off-the-Run page, a trader presses [Pg Fwd] from the Active Government Market page. To see all other page formats one by one, including Active, Bills and Personal, a trader presses [Ctrl] and either [Pg Fwd] or [Pg Back] simultaneously. [Pg Fwd] scrolls the display forward, and [Pg Back] scrolls backwards.

On all trading pages only one issue is highlighted at one time. When an issue is highlighted it is eligible for the next action. To highlight an issue, a trader moves to the desired issue with the [↑] or [↓] keys. Alternatively, a trader may type the line number of the issue and press [Enter]. The issue the trader moved to is then highlighted.

On the Active Government Market, Bills, Personal and Active Government Off-the-Run pages, the inventive system provides a "book" feature which shows multiple bids below and multiple offerings above the quoted market in addition to the best bid or offer. The "book" prices are shown in a window on a trader's selected page.

To go to the "book" window on a highlighted issue, a trader presses [Book]. The "book" is shown for that issue. To leave the "book" window, a trader presses [Book] again. The "book" window is removed. The "book" issue is changed when the highlighted issue is changed. The position of the "book" window on a trader's page can vary, depending on the cursor position. A pound sign (#) displayed before or after a price indicates that a trader has a bid or an offer at this price. If the price is shown in white it indicates that this price is best.

B. Order Entry And Execution

All orders in the trading system 10 are limit orders as that term is understood in the art and are "live" until canceled. The system accepts one bid and one offer per issue for that trader, and any change in market price or size cancels the previous order. The trader can be classified as a "single-order" or "multi-order" trader. If the trader is classified as a "single-order" trader and the trader enters a bid or an offer on an issue where the trader currently has one bid or offer outstanding, the new bid or offer replaces the old bid or offer, i.e., previous order is canceled. If the trader is classified as a "multi-order" trader and the trader enters a bid or an offer on an issue where the trader currently has one bid or offer outstanding, the new bid or offer is added in price and time sequence and the old bid or offer remains. A "multi-order" trader can have up to three bids or three offers outstanding in any one issue at any one time. Orders valued below the best bid or above the best offer are accepted by the system and appear in the "book." Orders can be entered from all pages except the Bulletin Board page. Prior to entering an order, the trader selects the desired issue by highlighting that issue.

When using any of the four action keys 232, 228, 230 or 226 on the keyboard 200, [Bid], [Offer], [Hit] or [Take], there is no need to type either an amount or a price. The following default rules apply when keys 226, 228, 230 or 232 are pressed:

1. Hit or Take entries automatically default to both size and price as displayed.
2. Bid or Offer entries automatically default to a minimum trading size. This is $5 million for bills, and $1 million for coupons.

When a trader presses one of the action keys 226, 228, 230 or 232, the trader's action is displayed in the Action Line at the bottom of the screen for the selected page. The cursor is placed after the action displayed to allow the trader to either change the amount or enter the order long hand (see Long Hand Order Entry, below). To continue the action, the trader presses [Enter]. To clear the action line, the trader presses [Reject].

To enter an order (Bid or Offer) or execute an order (Hit or Take), a trader follows the following steps. First, the trader highlights the desired issue. Second, the trader presses one of the action keys 226, 228, 230 or 232: BID, OFFER, HIT or TAKE. The selected action is displayed on the Action Line. To change the size or value of the requested transaction, the trader can type a size next to the action if desired, or keep the default. The [Enter] key is then pressed. The order for the issue selected is displayed in a small window on the trader's page. To change a price, the trader can tick the price up and down by pressing [ ↑ ] or [ ↓ ] while the issue is in the window, until the desired level is reached. Long Hand Order Entry may also be accomplished. Finally, the trader presses [Confirm] to complete the order or press [Reject] to cancel the order.

A trader can enter an order in long hand—that is, without using the abbreviated keystroke sequences facilitated by using special keys of the keypad 200—by typing in the size and the full price at the Action Line. To do so, the trader first enters the size of the issue desired, then presses the [→] key and type the full price information. For example, a trader could press [→] and then type 99.262 (which refers to a price of 99.26¼). The [←] key is used as a backspace. A trader cannot tick the price at the Action Line; ticking is done at the window on the page.

Another feature of the present trading system is the ability of a trader to adjust all of his/her pending orders by a predetermined number of ticks in a single key stroke. This feature finds application in the situation where a trader would like to stay in an up or down market but would like to adjust all of the prices of pending bids and/or offers for all issues being traded to reflect the trend in the market. In a preferred embodiment, the trader may adjust the prices of all bids by simultaneously pressing the [Alt]-[Bid] keys and then using the [ ↑ ] key or the [ ↓ ] key to indicate by how many price ticks the price of all bids should be adjusted up or down. The trader ma adjust the prices of all offers by simultaneously pressing the [Alt]-[Offer] keys and then using the [ ↑ ] key or the [ ↓ ] key to indicate by how many price ticks the price of all bids should be adjusted up or down.

These key stroke combinations invoke a routine in trader station program 138 to send a request to the market processor 110. A routine within the market memory program 90 processes the limit order price adjustment request.

A trader's bid or offer is shown on the screen preferably in green characters wherever the bid or offer is the "best" in the market. In the "book," if a trader's bid or offer is the best, a trader's bids and offers are preferably shown in white. All of the trader's orders will be shown in the "open book" directory to the left of "the book."

At the bottom of the screen is a one line transaction window. All orders, executions, cancellations and messages generated by the trading station are shown in the transaction window as they occur. The last transaction is always shown.

C. Example Orders (Bids And Offers)

Shorthand order entry may be accomplished in very few keystrokes on keypad 200. Shown following are some examples of orders and their corresponding keystrokes:

| Order | Keystroke |
| --- | --- |
| 1. Order Entered At default size: | |
| Bid (join) | [Bid] [Enter] [Confirm] |
| Bid (chg price) | [Bid] [Enter] [ ↓ ] or ( ↑ ] (Confirm] |
| Offer (along) | [Offer] [Enter] [Confirm] |
| Offer (chg price) | [Offer] [Enter] [ ↓ ] or [ ↑ ] [Confirm] |
| 2. Order Entered At A Trader's Specified Sizes: | |
| Bid (join) | [Bid] size [Enter] [Confirm] |
| Bid (chg price) | [Bid] size [Enter] [ ↑ ] or [ ↓ ] [Confirm] |
| Offer (along) | [Offer] size [Enter] [Confirm] |
| Offer (chg price) | [Offer] size [Enter] [ ↑ ] or [ ↓ ] Confirm] |

A trader can bid or offer better than or below the current best bid or offer. However, a trader may not bid through an offer or offer through a bid. The system will reject the action.

D. Example Executions (Hits And Takes)

Shown following are some example executions of hits and takes and the corresponding keystrokes.

1. At the size shown:

| Order | Keystroke |
| --- | --- |
| Buy | [Take] [Enter] [Confirm] |
| Sell | [Hit] [Enter] [Confirm] |

2. At A trader's specified size:
The designation "size" below is replaced with numerals indicating the transaction size:

| Order | Keystroke |
| --- | --- |
| Buy (partial) | [Take] size [Enter] [Confirm] |
| Sell (partial) | [Hit] size [Enter] [Confirm] |
| Buy (more than offered) | [Take] size [Enter] [Confirm] |
| Sell (more than bid) | [Hit] size [Enter] [Confirm] |

Note: A "take" bids the balance automatically, and a "hit" offers the balance automatically.

3. Through Best Bid Or Offer (Hit Or Take Into Book):

| Execution | Keystroke |
| --- | --- |
| Buy | [Take] size [Enter] [Confirm] |
| Sell | [Hit] size [Enter] [Confirm] |

Any action to "hit" cancels an offer; a "take" cancels a bid. A trader's input should reflect hitting or taking the exact amount of the balance which automatically cancels a trader's part of the bid or offer. If a trader enters input hitting or taking an entire bid or offer then the trader's part will again automatically cancel, but the trader will become the automatic bidder or offerer for the difference.

If, at any time prior to pressing [Confirm], a trader decides to change the transaction or wishes an error, press [Reject]. This clears the keypad for subsequent entries.

A trader may cancel any orders that originated from a trader's trader station and that are open in the market. An order can be canceled for a single issue, or all orders can be canceled at once. To cancel or delete one issue, two steps are used: First, the issue is highlighted; second, the trader presses [Kill]. The trader is asked to confirm or reject a trader's kill. The trader should then press [Confirm] to cancel the orders in the issue, or press [Reject] to keep the orders in the issue active.

To cancel all open orders, the following steps are used. First, the trader presses [Out]. The trader is asked to confirm or reject a trader's request. Second, the trader presses [Confirm] to cancel all open orders or presses [Reject] to change a trader's mind and keep all orders active.

The trader can also modify [Kill] and [Out] to cancel bids or offers only. For example, to cancel all bids in one issue, three steps are used: First, the issue is highlighted; second, the trader presses [Kill]; and, third, the trader presses [Bid]. The trader is then asked to confirm or reject a trader's kill for all bids. The trader should then press [Confirm] to cancel the bids in the issue, or press [Reject] to keep the orders in the issue active.

Pressing the [Menu] key brings up a window menu with the following options:
1. Display Executions
2. Lock Trader Station
3. Unlock Trader Station
4. (Reserved)
5. Sign-off from the system Pressing [Menu] again removes the menu display. The [ ↑ ] or [ ↓ ] keys are used to move in the menu. The arrow keys and [Confirm] are used to select an option and the [Reject] key is pressed to exit. The following discussion explains the functions which occur when one of the above menu functions is selected.

1. Display Executions: Displays all executed transactions issued from a trader's station in order of execution. Thus, this function serves as a trade blotter or trade audit log and is useful to check all trades for a day without leaving an active trading page.

2. Lock Trader Station: Allows a trader to lock the keyboard temporarily but leaves the terminal running.

3. Unlock Trader Station: Turns the keyboard back on and cancels the "lock" command. To unlock the trader station, a trader must enter the trading station password.

4. Sign-off from the system: Logs a trader off of the trading station, thereby ending the trading session. However, the communication link between the trader station and the remote computer system is maintained in an active state.

Setting Up Printer Support

If a trader has a printer available, the trader can elect to print a trade confirmation as a trader executes trades. This will give a trader hard copy verification of all trading activity conducted. To set up or change printer support, several steps are followed. First, at the system Main Menu, the trader highlights the items labeled "Turn Printer Support ON/OFF" and presses [Enter]. The trader is moved to a submenu with setup information. Next, the trader presses [Confirm] to turn the printer support ON or presses [Reject] to turn printer support Off. The trader is then returned to the system Main Menu.

From the above, it is apparent that many modifications and variations of the present invention ar possible in light of the above teachings. It is therefore to be understood that, within the scope of the appended claims, the invention may be practiced otherwise than as specifically described.

What is claimed is:

1. A keypad for interacting with a computer system having a display screen, the keypad comprising:
   a) a substantially planar base surface;
   b) a first key cluster positioned on a first portion of the plannar base surface, the first key cluster including:
      1) a numeric key set located on a lower portion of the first key cluster;
      2) a plurality of cursor movement keys located above the numeric key set and to the right of the numeric key set; and
      3) a plurality of trading order entry keys for entering and confirming order information, the plurality of trading order entry keys being located generally above the numeric key set;
   c) a second key cluster, positioned on a second portion of the planar base surface to the left of the first key cluster, the second key cluster including means for choosing display of pages of information on the display screen and for canceling order information previously entered using the order entry keys in the first key cluster, the second key cluster including:
      1) a plurality of page select and menu keys arranged within substantially in a "+" cross configuration of keys located in a central portion of the second key cluster;
      2) at least one key for cancelling open orders and bids and offers, located above the cross configuration;
      3) a key for defining a personal page display, located above the cross configuration;
      4) a key for displaying active market issues, located above the cross configuration; and
      5) a reject key, located below the cross configuration in the second key cluster, and located diametrically opposite the trading order entry key for confirming order information in the first key cluster, for cancelling orders before their entry into the system; and
   d) means, responsive to the first key cluster and the second key cluster, for communicating to the computer system signals indicative of closures of keys in the respective first key cluster and the second key cluster.

2. A keypad for interacting with a computer system having a display screen, the keypad comprising:
   a) a substantially planar base surface;
   b) a first key cluster positioned on a first portion of the planar base surface, the first key cluster including:
      1) a numeric key set,
      2) a plurality of cursor movement keys, and
      3) a plurality of trading order entry keys for entering order information;
   c) a second key cluster, positioned on a second portion of the planar base surface separate from the first portion, the second key cluster including means for choosing display of pages of information on the display screen and for canceling order information previously entered using the order entry keys in the first key cluster; and d) means, responsive to the first key cluster and the second key cluster, for communicating to the computer system signals indicative of closures of keys in the respective first key cluster and the second key cluster.

3. The keypad of claim 2, wherein the first key cluster further includes:

a key for entering a new bid.

4. The keypad of claim 2, wherein the first key cluster further includes:

a key for accepting a previous bid.

5. The keypad of claim 2, wherein the first key cluster further includes:

a key for entering a new offer.

6. The keypad of claim 2, wherein the first key cluster further includes:

a key for accepting a previous offer.

7. The keypad of claim 2, wherein the first key cluster further includes:

a set of keys for entering new bids and offers, and for accepting previous bids and offers.

8. The keypad of claim 2, wherein the first key cluster further includes:

a key for confirming entry or acceptance of bids and offers.

9. The keypad of claim 2, wherein the first key cluster further includes:

a key for displaying a small number of the best bids and offers.

10. The keypad of claim 2, wherein the second key cluster further includes:

a key for canceling all open orders entered through the keypad.

11. The keypad of claim 2, wherein the second key cluster further includes:

a key for cancelling all bids and offers.

12. The keypad of claim 2, wherein the second key cluster further includes:

a personal page display select key for selecting information previously displayed on the display screen; and a key for displaying a personal page including information previously selected using the personal page display select key.

13. The keypad of claim 2, wherein the second key cluster further includes:

a key for displaying active market issues.

14. The keypad of claim 2, wherein the second key cluster further includes:

a key for canceling a transaction before it is entered into the computer system.

15. The keypad of claim 2, wherein the second key cluster further includes:

a plurality of modifier keys for modifying function of other keys in the first and second key clusters.

16. The keypad of claim 2, wherein the second key cluster includes:

a modifier key for use with a key in the first key cluster so as to adjust all pending orders in a given direction.

17. The keypad of claim 2, wherein two of the cursor movement keys constitute keys for increasing or decreasing a value of a price by an incremental amount.

18. The keypad of claim 2, wherein:

the first key cluster further includes a key for confirming entry or acceptance of bids and offers;

the second key cluster further includes a key for canceling a transaction before it is entered into the computer system; and (1) the key for confirming entry or acceptance of bids and offers and (2) the key for canceling a transaction before it is entered into the computer system, are located on diametrically opposed corners of the respective first and second key clusters.

* * * * *